(12) United States Patent
Kolton et al.

(10) Patent No.: US 9,992,225 B2
(45) Date of Patent: Jun. 5, 2018

(54) SYSTEM AND A METHOD FOR IDENTIFYING MALWARE NETWORK ACTIVITY USING A DECOY ENVIRONMENT

(71) Applicant: TopSpin Security LTD., Herzelia (IL)

(72) Inventors: Doron Kolton, Pardesia (IL); Rami Mizrahi, Herzelia (IL); Omer Zohar, Rishon-LeZion (IL); Benny Ben-Rabi, Beit-Shemesh (IL); Alex Barbalat, Rishon-LeZion (IL); Shlomi Gabai, Rishon-LeZion (IL)

(*) Notice: Subject to any disclaimer, the term of this patent is extended or adjusted under 35 U.S.C. 154(b) by 122 days.

(21) Appl. No.: 14/847,315

(22) Filed: Sep. 8, 2015

(65) Prior Publication Data
US 2016/0080414 A1    Mar. 17, 2016

Related U.S. Application Data

(60) Provisional application No. 62/049,650, filed on Sep. 12, 2014.

(51) Int. Cl.
H04L 29/06    (2006.01)

(52) U.S. Cl.
CPC ........ H04L 63/1491 (2013.01); H04L 63/145 (2013.01); H04L 63/1416 (2013.01); H04L 63/1441 (2013.01); H04L 2463/142 (2013.01); H04L 2463/144 (2013.01)

(58) Field of Classification Search
CPC ............. H04L 63/1416; H04L 63/1491; H04L 63/145; H04L 63/1441; H04L 2463/144; H04L 2463/142
See application file for complete search history.

(56) References Cited

U.S. PATENT DOCUMENTS

| | | | |
|---|---|---|---|
| 9,329,973 B2* | 5/2016 | Bhuyan | G06F 11/36 |
| 9,332,023 B1* | 5/2016 | Wang | H04L 63/1416 |
| 9,537,888 B1* | 1/2017 | McClintock | H04L 63/145 |
| 9,609,019 B2* | 3/2017 | Vissamsetty | H04L 63/1491 |
| 2009/0103524 A1* | 4/2009 | Mantripragada, Sr. | H04L 65/1079 370/352 |
| 2009/0241191 A1* | 9/2009 | Keromytis | H04L 63/145 726/23 |
| 2010/0235919 A1* | 9/2010 | Adelstein | H04L 63/1425 726/25 |
| 2013/0133072 A1* | 5/2013 | Kraitsman | H04L 63/1408 726/23 |

(Continued)

*Primary Examiner* — Joseph P Hirl
*Assistant Examiner* — Stephen Gundry
(74) *Attorney, Agent, or Firm* — Michael J. Feigin, Esq.; Feigin and Fridman

(57) ABSTRACT

A system for gathering information about malware and a method of use therefor, the system comprising a working environment including physical working environment servers, physical working environment endpoints, a working environment network, a switch, and a router directing traffic between said working environment network and an external network, a decoy environment including at least one physical machine, a decoy environment server, a decoy environment endpoint, a decoy environment network and a decoy environment router, a file directing mechanism directing at least some files to the decoy environment, and a threat tracking mechanism tracking and observing actions triggered by the files in the decoy environment.

10 Claims, 2 Drawing Sheets

(56) References Cited

U.S. PATENT DOCUMENTS

| | | | |
|---|---|---|---|
| 2014/0215621 A1* | 7/2014 | Xaypanya | H04L 63/145 726/23 |
| 2014/0298461 A1* | 10/2014 | Hohndel | H04L 63/1416 726/23 |
| 2014/0317735 A1* | 10/2014 | Kolbitsch | H04L 63/145 726/23 |
| 2014/0337978 A1* | 11/2014 | Keromytis | H04L 63/145 726/23 |
| 2014/0366132 A1* | 12/2014 | Stiansen | H04L 63/1491 726/22 |
| 2015/0047032 A1* | 2/2015 | Hannis | H04L 63/1416 726/23 |
| 2015/0074810 A1* | 3/2015 | Saher | H04L 63/1466 726/23 |
| 2015/0121449 A1* | 4/2015 | Cp | H04L 63/145 726/1 |
| 2015/0242628 A1* | 8/2015 | Burt | H04L 63/1441 726/23 |
| 2015/0261955 A1* | 9/2015 | Huang | G06F 21/562 726/23 |
| 2015/0295943 A1* | 10/2015 | Malachi | H04L 63/145 726/24 |
| 2015/0312266 A1* | 10/2015 | Thomas | H04L 63/145 726/24 |
| 2015/0312267 A1* | 10/2015 | Thomas | H04L 63/145 726/1 |
| 2015/0312268 A1* | 10/2015 | Ray | H04L 63/1416 726/23 |
| 2015/0326587 A1* | 11/2015 | Vissamsetty | H04L 63/1408 726/23 |
| 2015/0326588 A1* | 11/2015 | Vissamsetty | H04L 63/1491 726/23 |
| 2015/0326592 A1* | 11/2015 | Vissamsetty | H04L 63/1408 726/24 |
| 2015/0326599 A1* | 11/2015 | Vissamsetty | H04L 63/02 726/11 |
| 2015/0350213 A1* | 12/2015 | Varadarajan | H04L 63/10 713/189 |
| 2015/0381637 A1* | 12/2015 | Raff | H04L 63/0218 726/23 |
| 2016/0021135 A1* | 1/2016 | Chesla | H04L 63/02 726/23 |
| 2016/0065601 A1* | 3/2016 | Gong | G06F 21/561 726/23 |
| 2016/0072838 A1* | 3/2016 | Kolton | H04L 63/145 726/23 |
| 2016/0099951 A1* | 4/2016 | Kashyap | H04L 63/145 726/23 |
| 2016/0112440 A1* | 4/2016 | Kolton | G06F 21/567 726/1 |
| 2016/0127413 A1* | 5/2016 | Kraitsman | H04L 63/1408 726/23 |
| 2016/0134643 A1* | 5/2016 | Giura | H04L 63/1441 726/23 |
| 2016/0212154 A1* | 7/2016 | Bobritsky | G06F 21/56 |
| 2016/0261631 A1* | 9/2016 | Vissamsetty | H04L 63/1491 |
| 2016/0323316 A1* | 11/2016 | Kolton | H04L 63/145 |

\* cited by examiner

SYSTEM AND A METHOD FOR IDENTIFYING MALWARE NETWORK ACTIVITY USING A DECOY ENVIRONMENT

RELATED APPLICATION

The present application gains priority from U.S. Provisional Patent Application No. 62/049,650 filed Sep. 12, 2014 and entitled A METHOD FOR IDENTIFYING MALWARE NETWORK ACTIVITIES USING A DECOY ENVIRONMENT, which is incorporated herein by reference as if fully set forth herein.

FIELD AND BACKGROUND OF THE INVENTION

The invention, in some embodiments, relates to the field of computer threats, and more specifically to identifying and gathering information about advanced persistent threats.

Advanced persistent threats, such as computer viruses, computer worms, Trojan horses, and other malware, particularly when infecting endpoints in an organization's network, are some of the most crucial security problems for many organizations. Current security mechanisms are generally unable to cope with, and to prevent, infections attacks, and as a result third parties, such as crackers and cyber-terrorists, are able to insert malware into the networks of such organizations. Once malware is present on an organization's network, the malware communicates with its controllers, such as hackers and cyber-terrorists, via command and control (C&C) mechanisms, which direct the malware as to what data to obtain, where to find such data, and where to send the data once it is obtained. Typically, communication between malware and its command and control uses common protocols, such as HTTP, payload or encrypted payload over TCP and IRC. Some malware families are able to work independently, and only exfiltrate the data they are able to collect within the organization, whereas other families are remotely controlled by the attacker through a Remote Administration Tool (RAT).

One method currently used for identifying the presence of malware on a network involves signature matching or pattern matching of malware families. For this method to properly identify the presence of malware, the malware must first be caught and analyzed to derive one or more relevant signatures, which signatures are then used to prevent a malware infection by such malware in other computers in the network or in other networks. However, malware signatures are changed, added and mutated constantly, and signature analysis tools typically cannot keep up with the changing malware signatures, and therefore this method is far from failsafe.

In other methods, machine learning, behavioral analysis, and classification algorithms are used to find packets within the network traffic which include communication between malware within the network and the command and control mechanism controlling the malware, or other suspicious activities in the network. However, this method requires collecting all the traffic to and from the organization, collecting data from assets inside the organization and the computational analysis methods used to implement this technique often trigger false positives and/or suffer from false negatives.

Another method, known as "sandboxing", involves running suspicious code in a secluded emulation environment, also called a sandbox, in order to identify the purpose of the code without the code being able to access the real resources of the organization. For example, a sandbox may be implemented by installing a proxy at the gateway to a network, and executing all HTTP pages within the proxy prior to forwarding them to the requesting node or computer within the network. However, there are multiple different methods by which malware can bypass a sandboxing technology, thereby reducing the effectiveness of this technology.

Specifically, use of a sandbox or emulation environment involves two main problems. First, there are multiple ways to evade the sandbox, for example by malware execution being delayed relative to the time of infection, such as by a week or more, or by the malware checking to see whether this computer is being used for various kinds of normal activities. In such cases, the sandbox does not block entrance of the malware into the network as the malware does not appear to be an executable when it first arrives. In some cases, the malware may determine that it is being run in an emulation environment, and delay execution of the attacking portion of the code to a later stage or decide not to execute at all, until it determines that it is no longer being run in the emulation environment.

A second problem is that when the sandbox or other emulation environment or technology manages to block an attack, one cannot gather intelligence regarding the goals and method of operation of the attacking malware in the targeted environment. Due to the fact that, after a failed or blocked initial attack attempt, most attackers continue to try to penetrate the same organization, it is beneficial for the organization to know what the attackers are after and how the attacking code operates in order to better protect the organization against subsequent attacks by the same attacker and specifically to know how the attacker will operate within this specific environment of the organization.

There is thus a need for a technology which identifies the activities of attacking malware in a way that prevents the malware from circumventing the technology, while allowing an organization's security team to gather information regarding the attacking malware's methods of operation and activities in an environment that mimics the real environment.

SUMMARY OF THE INVENTION

The invention, in some embodiments, relates to the field of computer threats, and more specifically to gathering information about advanced persistent threats.

According to an aspect of some embodiments of the invention there is provided a system for gathering information about malware, including:
  a working environment including:
  a plurality of working environment servers;
  a plurality of working environment endpoints;
  a working environment network interconnecting the plurality of working environment servers and the plurality of working environment endpoints;
  at least one working environment switch directing traffic within the working environment network; and
  at least one working environment router directing traffic between the working environment network and an external network;
  a decoy environment including:
  at least one physical machine;
  at least one decoy environment server;
  at least one decoy environment endpoint;

a decoy environment network interconnecting the at least one physical machine, the at least one decoy environment server and the at least one decoy environment endpoint; and at least one decoy environment router directing traffic between the decoy environment network and an external network;

a file directing mechanism, functionally associated with the working environment and with the decoy environment, directing at least some files intended for the working environment to the at least one physical machine of the decoy environment; and a threat tracking mechanism, functionally associated with the decoy environment, tracking and observing actions triggered by the at least some files in the decoy environment.

In some embodiments, the system further includes a threat identifying mechanism, functionally associated with the working environment and with the file directing mechanisms, identifying suspicious files intended for the working environment, and providing the suspicious files to the file directing mechanism for directing to the decoy environment. In other embodiments, the file directing mechanism directing all files intended for the working environment to the decoy environment. In some embodiments, In some embodiments, at least one of the at least one decoy environment server and the at least one decoy environment endpoint comprises the at least one physical machine.

In some embodiments, at least one of the at least one decoy environment server and the at least one decoy environment endpoint comprises a virtual machine.

In some embodiments, the threat tracking mechanism further providing information about tracked and observed actions triggered by one or more of the at least some files to the working environment.

In some embodiments, the working environment includes network traffic, and the decoy environment includes network traffic mimicking the network traffic in the working environment. In some such embodiments, the network traffic of the decoy environment is generated based on at least one of observation of the network traffic in the working environment, sniffing the network traffic in the working environment and providing responses to requests from the decoy environment based on the sniffed network traffic, and making assumptions regarding the network traffic in the working environment.

In some embodiments, at least one of the at least one decoy environment server and the at least one decoy environment endpoint includes at least one file mimicking characteristics of at least one file in at least one of the plurality of working environment servers and the plurality of working environment files, such that the at least one file in the decoy environment does not include data of the at least one file being mimicked.

In some embodiments, at least one of the at least one decoy environment server and the at least one decoy environment endpoint includes a file system (golden image) mimicking a complete file system of a corresponding one of the plurality of working environment servers and the plurality of working environment endpoints, without including the data contained in the corresponding one of the plurality of working environment servers and the plurality of working environment endpoints.

In some embodiments, the threat identifying mechanism forms part of the working environment and enables one way communication with the decoy environment for directing the at least some files to the decoy environment.

In some embodiments, the threat identifying mechanism comprises a threat identifying router external to the working environment and to the decoy environment, the threat identifying router receiving all traffic intended for the working environment, and in addition to directing all received traffic to the router of the working environment, also directing the at least some files to the router of the decoy environment.

According to another aspect of some embodiments of the invention there is provided a method for generating a network response to a network request in a decoy system functionally associated with a network of an organization, the method including:

collecting requests made to nodes in the network of the organization and responses associated therewith in a database, the decoy system having access to the database;

upon receipt of a request by the decoy system, finding in the database a past request, similar to the received request;

from the decoy system, providing a response to the received request, the response based on a past response associated with the past request in the database.

In some embodiments, collecting requests and responses includes collecting at least one of single request-response pairs and sessions of requests and responses.

In some embodiments, collecting includes maintaining, in the collected requests and responses, a structure of traffic within the network of the organization.

In some embodiments, the database is dedicated to a specific type of communication or server, and the collected requests and responses relate to the specific type of communication or server.

According to further aspect of some embodiments of the invention there is provided a method for identifying a process running malware in an infected endpoint of a network using a decoy system, the method including:

tracking communication between the decoy system and at least one of a process in the infected endpoint and the infected endpoint to identify at least one characteristic of a communication channel between the infected endpoint and the decoy system;

initiating communication between the decoy system and the infected endpoint;

during the communication between the decoy system and the infected endpoint, using at least one communication method to gather information about the infected endpoint and processes running thereon; and based on information gathered from the infected endpoint using each of the at least one communication method, identifying a process running in the infected endpoint through which infecting malware is operating.

In some embodiments, the at least one characteristic includes at least one of:

an IP address of the infected endpoint;

an IP address of the decoy system;

a communication port of the infected endpoint used for communication with the decoy system;

a communication port of the decoy system used for communication with the infected endpoint; and a communication protocol used in communication between the infected endpoint and the decoy system.

In some embodiments, the at least one communication method includes using at least one of:

remotely accessing resources on the infected endpoint using at least one management application programming interface (API);

starting a dedicated agent on the infected endpoint; and remotely retrieving information from the infected endpoint.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

Embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers or monitors. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Figure 1:
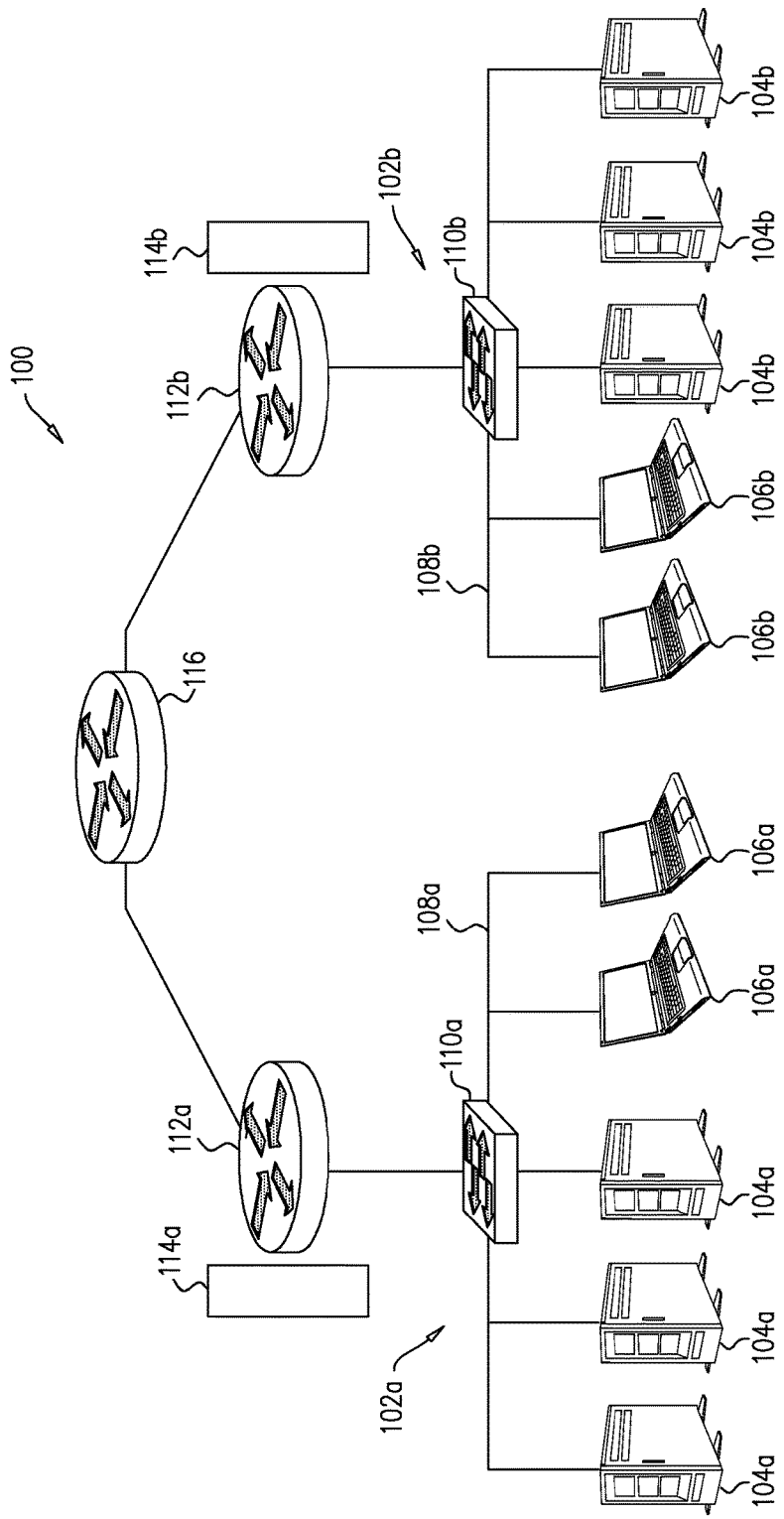
FIG. 1 is a simplified graphic representation of an embodiment of a network for gathering information about advanced persistent threats in accordance with an embodiment of the teachings herein.

The invention, in some embodiments, relates to the field of computer threats, and more specifically to identifying, detecting and gathering information about advanced persistent threats and malware.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

In general, rather than creating a sandbox, the technology disclosed herein creates a decoy environment mimicking the networks and resources of an organization, such that suspected malware files entering the organization are placed and run on dedicated physical machines, and interact with decoy machines, physical or virtual. In some embodiments, any file received by the network which cannot be identified as a clean, or non-malicious file, is directed to the decoy environment, in parallel to entering the organization. In other embodiments, all files received by the network are directed to the decoy environment in parallel to entering the organization. Due to the fact that the decoy environment includes all the components and operations of the regular network, and that the suspected malware files are loaded onto a real physical machine, the attacking malware begins its execution as if it were operating on a normal user's machine and does not recognize its being in an emulation environment, and therefore does not delay execution or otherwise evade detection. It is important to note that the emulation is done for the organization's environment while the malware itself is running and executing on a regular physical machine, and therefore cannot use any kind of evasion technique.

The decoy environment emulates the structure of the actual network of the organization using physical or virtual machines, and is built based on information gleaned from the actual network or learned therefrom by methods of traffic sniffing or making assumptions as to the operation of the actual network. Consequently, the actions of the attacking malware in the decoy environment, such as the servers and/or databases accessed, communication with command and control and the like, can provide information regarding the methods used by the attacker to glean data from the network using the malware, and allow the organization to defend sought after resources within the actual organization network. The various components of the technology herein are described in further detail hereinbelow.

Reference is now made to FIG. 1, which is a simplified graphic representation of an embodiment of an exemplary network 100 for gathering information about advanced persistent threats in accordance with an embodiment of the teachings herein.

As seen in FIG. 1, a network 100, forming part of an organization such as an office, a bank, or the like, includes a working environment 102a used by the organization's employees during standard operation of the organization, and a decoy environment 102b used for tracking, and gleaning information about, malicious files and attacks.

In some embodiments, such as the illustrated embodiment, the decoy environment 102b is a skeletal environment, including only the environment elements required in order to make sure that the malware fails any attempt at using evasion mechanisms, and to be able to track the operation of the malware and what portions, or data, in the organization it seeks. In such embodiments the decoy environment must include: at least one physical machine onto which suspected malware files are loaded, a local area network (LAN) connecting elements of the decoy environment, a wide area network (WAN) connection to an external network, such as a connection to the Internet, at least one server which parallels, or mirrors, a server in the working environment, and at least one endpoint which parallels, or mirrors, an endpoint in the working environment. In some embodiments, the decoy environment includes servers mirroring all the servers in the working environment and/or endpoints mirroring all the endpoints in the working environment, simulated traffic within the LAN, and simulated activities of the endpoints. The servers and endpoints mirroring those of the working environment may be physical machines or virtual machines, provided that the suspected malware files are loaded onto a physical machine, be it an endpoints or a server.

In other embodiments, the decoy environment 102b completely parallels the working environment 102a, and includes at least one instance, and in some cases an exact replica, of all the elements included in the working environment, including resources such as switches, routers, firewalls, Internet connections such as WiFi, endpoints running applications, servers running applications such as databases, web servers, and an email system, and any other component that is included in an organization's working environment or is unique to a specific organization's working environment.

In some embodiments, the decoy environment 102b comprises hardware components, such as servers, endpoint nodes, routers, and switches, and has therein decoy data. In other embodiments, the decoy environment 102b comprises a single hardware, physical machine, onto which the suspected malware is loaded, and comprises additional software components interacting with the suspected malware. The use of hardware components is important in order for the attacking malware not to be able to sense that it is in an emulation environment, and thus not to delay attacking operations.

The decoy data is specifically selected so as to "tempt" the malware to attack, while preventing the malware from obtaining any sensitive information about the organization. In some embodiments the data in the decoy environment is generated based on data collected in the organization, for example by sniffing traffic to, from, and within the organization, getting information from administrators and the like. However, as mentioned above, in some embodiments no network traffic is generated in the decoy environment.

In some embodiments, the behavior of network nodes, such as servers and/or endpoints, in the working environment, may be mimicked by sniffing traffic within the organization, and collecting traffic between assets within the organization. This may include, for example, storing requests sent to a node, as well as the response provided by the node, in a suitable database or other storage location, such that nodes of a decoy system, or decoy environment as described herein, have access to the database. The stored request and response may be a single request-response pair or may constitute a session of requests and responses. In some embodiments, the stored requests and responses will maintain the structure of traffic within the organization, such as the structure of the packets, the payload, etc. Typically, most of the traffic in the database will be based on client-server operations between nodes and servers or other service providing assets within the network.

When a request is received by a network node in the decoy environment or in any other decoy system, the decoy node accesses the database to find a corresponding, or similar, request, and provides a response based on the response available in the database. For example, the decoy node may use the response found in the database with relevant and required changes such as changes to headers and/or TCP sequence numbers.

In some embodiments the database may be generic for a network, and may include requests and responses relating to all types of traffic and assets in the network. In other embodiments, a separate database may be defined for each type of server or asset in the organization. For example, separate databases may be built for requests from a web server, requests from an FTP server, requests from a Windows2012 server, and the like. As such, each server in the decoy environment would be associated with a specific database based on the functionality of that server in the working environment of the organization.

It is appreciated that such a method for generating responses would make it more difficult for an attacker to determine whether or not the environment in which the malware is operating is a decoy environment or a working environment.

It is further appreciated that though the method of creating responses is described with respect to a decoy environment as disclosed herein, it may be useful in any type of decoy system, such as a honeypot system or any other malware deceiving system.

Additionally or alternately, the traffic in the decoy environment may be modeled in manners that do not exactly reflect the traffic in the organization. For example, the decoy data files may have names paralleling those of important files in the working environment, causing the malware to try and glean information from these files, but the files themselves may contain completely useless information, so that the malware does not glean any information about the organization from the decoy environment. As a further addition or alternative, complete file systems (golden images) of endpoint and servers, without the actual data typically contained therein, can be retrieved from the organization's working environment and loaded into the decoy environment.

It is appreciated that the decoy environment 102b, or at least the physical machine thereof onto which the suspected malware files are loaded, must include access to the Internet or to other exterior networks used by the organization, in order to allow the attacking malware to communicate with its Command and Control servers, to download attacking tools, and/or to operate in the same way that it would when running in the actual network environment. In this manner, the activities of the attacking malware in the decoy environment may be tracked and used to glean information regarding an attacker's goals or strategies. Tracking the operations of the malware within the decoy environment, such as which servers and files the malware tried to access, enables the organization to better defend the working environment 102a against such attacks, and to provide information to other networks and organizations regarding the operations of such malware.

In some embodiments, the decoy environment 102b uses the same IP address allocation as used in the working environment 102a. In other embodiments, the decoy environment 102b uses an IP address range and/or allocation scheme not corresponding to that used in the working environment 102a.

In some embodiments, the decoy environment 102b is built alongside the working environment 102a, for example in the same server closet or the like but without any network connection to the working environment. In some embodiments, the decoy environment 102b and the working environment 102a are connected to each other with a unidirectional connection, allowing communications only from the working environment to the decoy environment, and not in the opposite direction (from the decoy environment to the working environment). In other embodiments, the decoy environment 102b is built on the premises of the organization but with physical separation from the working environment 102a. In yet other embodiments, the decoy environment 102b is built remotely to the organization's premises and to the working environment 102a, such as on a Cloud. In some such embodiments, the Cloud may include a network structure that serves as a decoy network for multiple different organizations.

Typically, the working environment 102a and the decoy environment 102b include servers 104a and 104b, respectively, and endpoints 106a and 106b, respectively, for example running various flavors of windows and Linux which are the same in the working environment and in the decoy environment. As mentioned above, at least one of the decoy environment servers 104b and the decoy environment endpoints 106b is a physical machine, onto which suspected malware files are loaded as explained herein. Servers 104a and 104b and endpoints 106a and 106b are typically loaded with relevant off-the-shelf software packages and applications, such that the servers 104b and endpoints 106b of the decoy environment run software packages and applications similar to those running in the working environment. The software loaded onto the working environment machines and the decoy environment machines may also include specific applications which are relevant for or used by the specific organization that the malware is trying to exploit. Such software may also be software that was developed by the organization and/or its employees or 3$^{rd}$ party software packages bought by the organization. The servers 104a and 104b may include any suitable type of server, including database servers, web servers, email servers, Active Directory servers, FTP servers, and the like. It is appreciated that other than the specific machines onto which the suspected malware files are loaded, all other servers 104b and endpoints 106b may be virtual machines.

The servers 104a and nodes 106a are interconnected by one or more LANs 108a, which also includes one or more switches 110a directing traffic within the LAN, and one or more routers 112a directing traffic between elements of the LAN 108a and an external network, such as the Internet or any other Wide Area Network (WAN). Similarly, the servers 104b and nodes 106b are interconnected by one or more LANs 108b, which also includes one or more switches 110b directing traffic within the LAN, and one or more routers 112b directing traffic between elements of LAN 108b and an external network such as the Internet or any other Wide Area Network (WAN). In some embodiments, routers 112a and 112b are associated with firewalls 114a and 114b, respectively, though it is appreciated that due to the different purposes of environments 102a and 102b, the firewalls 114a and 114b may have different rules governing their operation. A similar deployment according to an embodiment of the teachings herein may have all the networking devices included in the working environment emulated as part of the decoy environment.

In some embodiments, routers 112a and 112b are further connected to an additional router 116, which is configured to receive files from router 112a of the working environment and to direct these files to the decoy environment 102b via router 112b thereof. In some embodiments router 116 may be replaced by a Proxy, web server gateway, or any other suitable entry point into the network. In some embodiments the router 116 receives from router 112a all files directed to the working environment, whereas in other embodiments the router 116 receives from router 112a only files that are not known to be safe, and are therefore suspected as being malicious.

Alternately, router 116 may receive all communications directed to the working environment 102a such that all files are forwarded from router 116 to the working environment 102a via router 112a, and at least some of the files are also forwarded from router 116 to the decoy environment 102b via router 112b. In some such embodiments, router 116 directs all files arriving at the working environment also to the decoy environment. In other embodiments, router 116 evaluates the received files to determine whether they are safe, and only forwards to the decoy environment files that may be malicious.

In other embodiments, a sniffing element, located for example at the entrance to the working environment, may sniff all traffic arriving at the working environment 102a, retrieve from the traffic all files not identified as safe files, and possibly all files, and load the retrieved files into the decoy environment 102b, in parallel to them arriving at the working environment. In yet other embodiments, a dedicated network connector exists in the working environment and/or in the mail server and is suitably networked so that the connector retrieves files from the mail server or other entrance to the working environment and sends the retrieved files from there to the decoy environment.

In yet further embodiments, a node of the decoy environment 102b may communicate with one or more Internet applications, such as a bank's web portal or a shopping web site, so as to lure malware, such that the malware will also try to access the relevant Internet application, by forming a sort of Honey Token. As such, the lured malware would also arrive in the decoy environment 102b.

It is appreciated that though communication between a node of the decoy environment and an Internet application is described with respect to a decoy environment as disclosed herein, it may be useful in any type of decoy system, such as a honeypot system or any other malware deceiving system.

As mentioned hereinabove, traffic within decoy environment 102b is generated to be similar to the traffic within the working environment 102a, for example based on traffic seen in the working environment, and includes traffic between endpoints 106b, traffic between endpoints 106b and servers 104b, and traffic between endpoints 106b and an external network such as the Internet.

In some embodiments, the activity at endpoints 106b of the decoy environment 102b and/or the physical machines onto which the suspected malware files are loaded simulates normal user activity on an endpoint 106a or other machine of the working environment, and typically includes one or more of manipulation of files (e.g. text files, word processing files, presentation files, and spreadsheet files), sending and receiving emails, and browsing the Internet, among other standard uses of a network endpoint.

Figure 2:
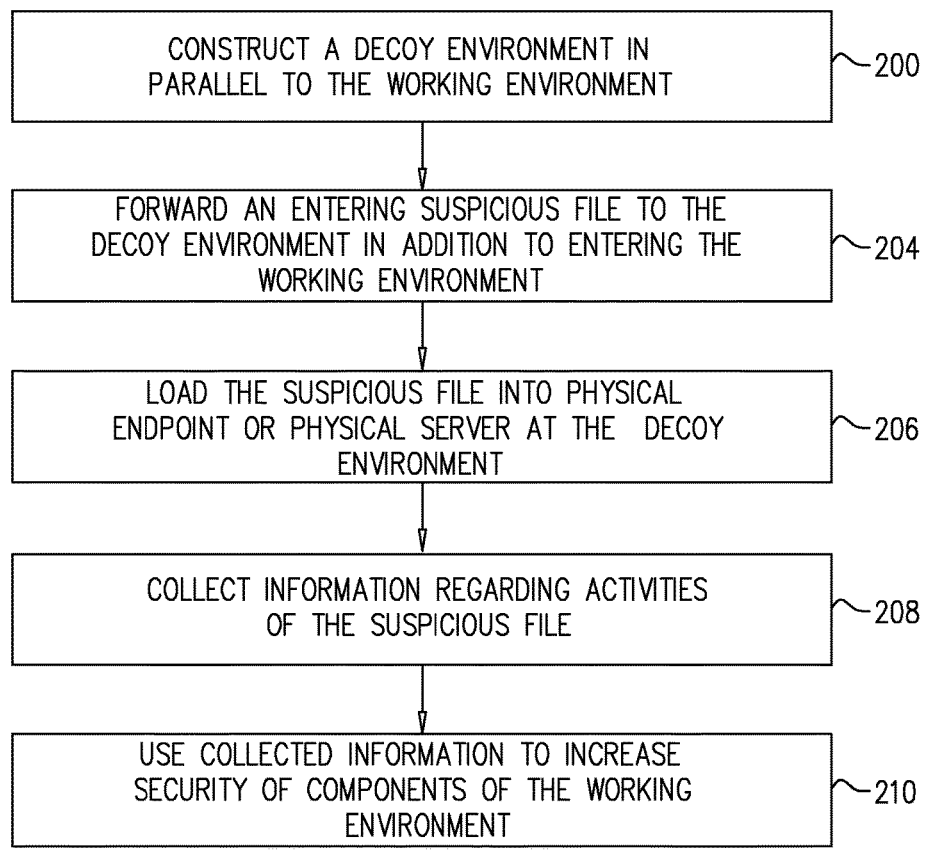
FIG. 2 is a flow chart of an embodiment of a method for gathering information about advanced persistent threats in accordance with an embodiment of the teachings herein.

The functionality and use of the system described hereinabove with respect to FIG. 1 is now explained with reference to FIG. 2, which is a flow chart of an embodiment of a method for gathering information about advanced persistent threats in accordance with an embodiment of the teachings herein.

As seen at step 200, a decoy environment as described hereinabove with respect to FIG. 1 is constructed to parallel the working environment of the organization.

At step 204, when a file enters the working environment of the organization, and is not identified as a legitimate, or authorized file, the file is forwarded, via a decoy forwarding router, via a dedicated connector in the working environment and/or in a mail server, gateway, and/or proxy in the working environment or the gateway or the proxy or the mail server, or via any other suitable mechanism, to the decoy environment, in addition to entering the working environment in the usual manner. The files transferred to the decoy environment may include, for example, files that are downloaded while browsing, files that are received as email attachments, and the like, and that are not classified by the organization as not carrying any form of malware. For example, in an organization that uses an email scanner, if the email scanner cannot define a file as "clean", the file would be forwarded to the decoy environment. However, in some embodiments, all files entering the organization may be directed to the decoy environment for processing therein.

The files to be forwarded to the decoy environment may be collected, or received, from suitable systems located at entry points into the organization, such as gateways and email scanners. Files may also be received from a sniffer located at such relevant entry points, which sniffer sniffs the contents of entering files, and forwards unidentified files, or files identified as being malicious, to the decoy forwarding router for forwarding to the decoy environment.

Once the files arrive at the decoy environment, at step 206 they are loaded into at least one physical endpoint and/or physical server in the same way as they would be in the working environment, for example according to instructions provided by decoy environment switches, or opened using known software, for example as Microsoft office files, PDF files and the like. This process results in infection of at least one of the endpoints and/or servers of the decoy environment, in a similar manner to that which occurs when the working environment is infected with malware.

Due to the fact that the decoy environment fully or partially simulates the working environment, and is not only a dulled-down emulation environment like prior art sandboxes, any malware infecting the decoy environment operates in the same manner as it would within the working environment. Since the malware is running on physical machines within the decoy environment, it cannot in any way use any evasion techniques. Consequently, at step 208, information regarding activity of the malware is collected, such as, for example, the endpoints, servers, and files that the malware accesses or manipulates. The information may be collected in a dedicated network manager node or log in the decoy network collecting information regarding systems in the decoy environment accessed by the malware and actions of the malware in these systems. Additional information may be collected in a dedicated log located on the egress point to the Internet or other external network, which records all the Internet traffic generated by or including information from the malware.

In some embodiments, the information collected in the decoy environment at step 208 is retrieved by the working environment and/or by a human operator, and is used to increase the security of endpoints, servers, and files in the working environment at step 210. For example, if in the decoy environment the malware attempts to access a specific file or server, that specific file or server may be better protected within the working environment, for example by changing its permission, by encryption, and the like. In some embodiments, the information may be transmitted from the location in the decoy environment where it has been collected directly to the working environment, such as to a Security Information and Event Manager (SIEM). In some embodiments, the decoy environment includes a user interface, enabling a human operator to access logs and to retrieve information collected in the decoy environment.

In some embodiments, the decoy system described herein, or any other decoy or honeypot system, may identify the exact process through which the malware is communicating with the decoy assets. Typically, the decoy or honeypot is able to identify the endpoint or node from which the malware is operating, but not to provide any information regarding the properties of the malware.

Due to the communication between the decoy environment's assets and the malware, or the node on which the malware is running, details of the communication channel between the infected node (on the working environment or on the decoy environment) and the decoy environment assets are known. As such, the IP address of the infected endpoint, the communication port on the infected endpoint, the IP address and communication port of the decoy environment asset with which the malware communicates, and the communication protocol being used (e.g. HTTP, FTP, RDP, etc) are all known.

In order to identify the process on the infected endpoint which is communicating with the decoy systems, and hence the malware itself, the decoy environment, e.g. a manager of the decoy environment, may communicate with the infected endpoint using various different methods, including, for example, remotely accessing resources on the infected endpoint using different management application programming interfaces (APIs) or starting a dedicated agent on the infected endpoint or remotely retrieving information from the infected endpoint. Such communication, in combination with the known information listed hereinabove, will allow the decoy environment to find out which process on the endpoint is actually communicating with the decoy systems, and thus will provide for exact identification of the process running the malware.

For example, dedicated process recognition APIs may be used while the infected endpoint is communicating with another decoy system of the decoy environment, once the details required for operation of these APIs are known from the use of the decoy environment. Due to the fact that such recognition APIs require an active communication link, the decoy environment, e.g. via a manager node or an operator thereof, may use various methods to interact and interoperate with the infected endpoint and to prolong such interaction in a way that will provide the decoy environment sufficient time to remotely access the infected endpoint and to identify the process running the malware.

It is further appreciated that though the method of identifying the process running the malware is described with respect to a decoy environment as disclose herein, it may be useful in any type of decoy system, such as a honeypot system or any other malware deceiving system.

In the context of the present application and claims, the term "node" or "endpoint" relates to any machine forming part of a network, including, inter alia, end user computers, servers, proxies, ports, printers, scanners, fax machines, copiers, imaging machines such as X-ray machines and MRI machines, and in general to any machine using a CPU and an operating system which is connected to an organization's network.

In the context of the present application and claims, the term "resource" relates to any file or component of the network which can be accessed using a URI and with which a node can communicate, including, inter alia, web pages, images, documents, sound files, multimedia files, executable files, scripts, applets, and programs.

In the context of the present application and claims, the terms "malware" and "advanced persistent threat" may be used interchangeably, and relate to any type of software which can enter a node or a network, remain in the node or network, and collect information about the node or network and/or make changes to or manipulate the node or network. Malware may be permitted by the user to enter the node or network, typically without the user knowing that the software he allowed into the node or network is malicious, or may enter the node or network without the user knowing about it. Malware may include, inter alia, viruses, worms, Trojan horses, adware, spyware, bots, bugs, and rootkits. Malware may operate independently, or may be operated and controlled remotely by a hacker that constantly communicates with the malware using different mechanisms such as web traffic, USB devices, and the like.

In the context of the present application and claims, the term "command and control" relates to a resource that communicates with malware already in a node or a network, and instructs the malware what actions to take or what data to collect.

In the context of the present application and claims, the term "decoy system" relates to any system used for trapping or deceiving malware and other advanced persistent threats, such as a decoy environment as described herein, a honeypot system, and the like.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A method for identifying malware and for gathering information about identified malware in a decoy environment associated with a working environment, the method comprising:
providing a decoy environment including:
at least one physical machine;
at least one decoy environment server;
at least one decoy environment endpoint;
a decoy environment network interconnecting said at least one physical machine, said at least one decoy environment server and said at least one decoy environment endpoint; and
at least one traffic directing mechanism for directing traffic from an external network to said decoy environment network;
directing at least some files intended for the working environment to said at least one physical machine of said decoy environment;
executing said at least some files directed to said decoy environment on said at least one physical machine of said decoy environment; and
tracking and observing actions triggered by said at least some files in said decoy environment, and
upon receipt of a network request in said decoy environment network, said network request originating from attacking malware running in said decoy environment, generating in said decoy environment network a network response to said network request, the network response mimicking a response that would be made by a network of said working environment, said generating including:
collecting requests made to nodes in said network of said working environment and responses associated therewith in a database, said decoy environment network having access to said database, including collecting at least one of single request-response pairs and sessions of requests and responses;
upon receipt of said network request by said decoy environment network, finding in said database a past request, similar to said received network request; and
from said decoy environment network, providing a response to said received request, said response based on a past response associated with said past request in said database.

2. The method of claim 1, wherein said collecting comprises maintaining, in said collected requests and responses, a structure of traffic within said network of said organization.

3. The method of claim 1, wherein said database is dedicated to a specific type of communication or server, and wherein said collected requests and responses relate to said specific type of communication or server.

4. The method of claim 1, further comprising identifying suspicious files intended for said working environment, and transferring said suspicious files to said traffic directing mechanism for directing to said decoy environment.

5. The method of claim 1, wherein said directing at least some files comprises directing all files intended for said working environment to said decoy environment.

6. The method of claim 1, at least one of said at least one decoy environment server and said at least one decoy environment endpoint comprises said at least one physical machine.

7. The method of claim 1, at least one of said at least one decoy environment server and said at least one decoy environment endpoint comprises a virtual machine.

8. The method of claim 1, said tracking and observing further comprising providing information about tracked and observed actions triggered by one or more of said at least some files to said working environment.

9. The method of claim 1, wherein said working environment includes network traffic, and said providing said decoy environment includes providing in said decoy environment network, network traffic mimicking said network traffic in said working environment.

10. The method of claim 1, wherein said at traffic directing mechanism comprises at least one router.

* * * * *